June 23, 1959 — G. H. ZUK — 2,891,324
BRAILLE BOOK READER
Filed April 15, 1954
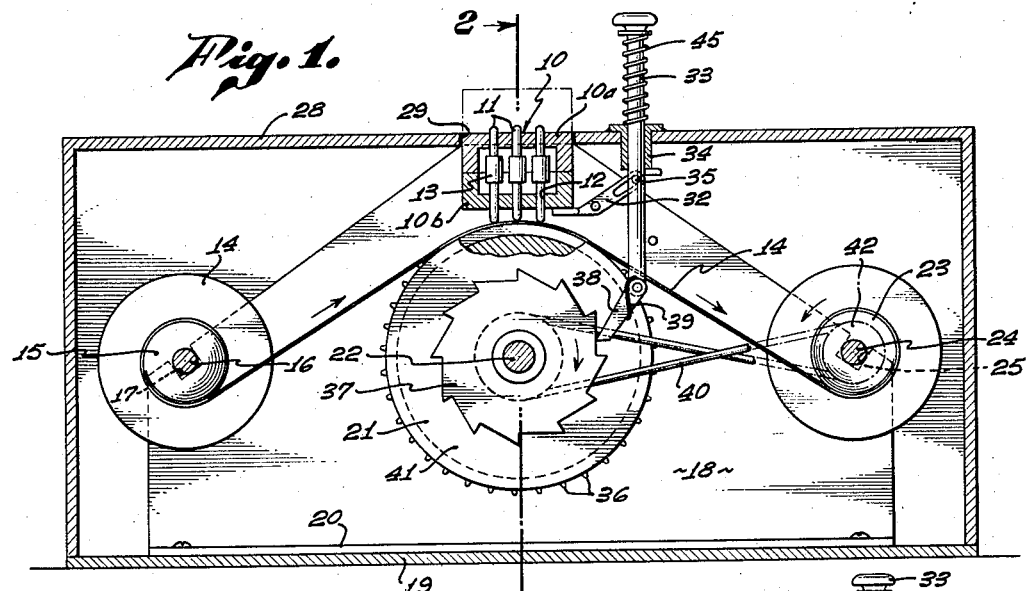
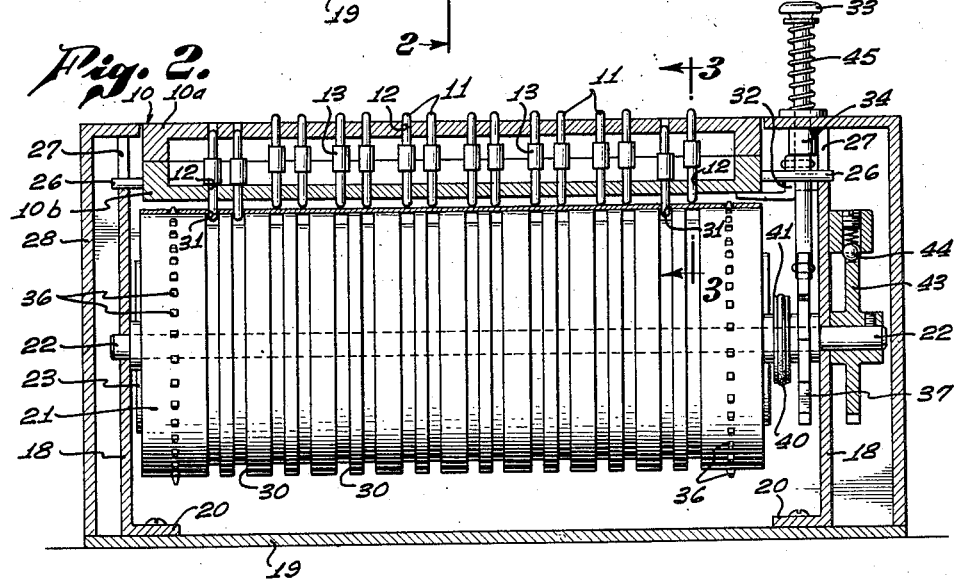
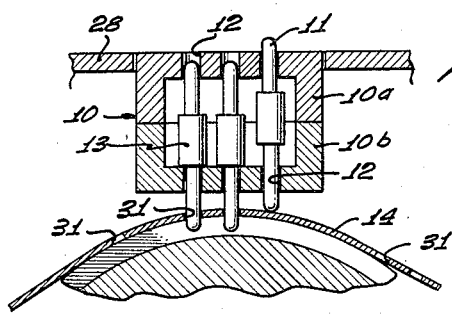
INVENTOR.
GERALD H. ZUK,
BY
Flam and Flam
ATTORNEYS.

United States Patent Office 2,891,324
Patented June 23, 1959

2,891,324

BRAILLE BOOK READER

Gerald H. Zuk, Chicago, Ill.

Application April 15, 1954, Serial No. 423,336

7 Claims. (Cl. 35—35)

This invention relates to a system and apparatus for reading by blind persons.

Ordinary braille books are expensive, requiring an embossing process. Heavy paper is required to provide some degree of permanence to the characters, also contributing to the expense, especially after continued use, the characters may become difficult to read. Such books are also quite bulky, the projections forming the braille characters preventing the pages from closely overlying each other, and the paper itself being thick. Since braille books are expensive, they are extensively circulated. Since reading is accomplished by touch, conditions for sanitation are unfavorable.

It is an object of the present invention to overcome these disadvantages and provide a novel and improved system and compact portable apparatus for reading by blind persons.

It is another object to provide apparatus of this character whereby the reader may readily find his place if reading is interrupted.

It is another object of this invention to make it possible to avoid contact of the fingers with the book itself, but instead to utilize a bar or the like which may be readily kept clean and sanitary for the sole use of the reader. The book is thus capable of continued repeated use by many persons without being subjected to wear and without accumulation of foreign matter on the exposed surfaces of the book.

For this purpose, use is made of an individualized structure capable of forming characters in accordance with information supplied by a roll. The apparatus has a number of sets of movable pins having tactile ends, each set comprising six pins arranged in two rows of three each. The tape or roll passes beneath the pins and has perforations arranged to register with some of the pins. The upper ends of the pins that do not drop through the perforations form the braille characters. In reading, the blind person passes his hand over the structure and need not handle the book itself. The book is intermittently advanced by an appropriate mechanism so that the apparatus forms successive lines of characters. The book at all times may be accommodated in an enclosure, protecting it against damage and maintaining a sanitary condition.

Since the book has perforations rather than projections, and since the use of heavy paper for embossing is obviated, the braille book is quite compact.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a transverse sectional view of an apparatus incorporating the present invention;

Fig. 2 is a sectional view, taken on the plane indicated by line 2—2 of Fig. 1; and Fig. 3 is an enlarged fragmentary sectional view of a part of the apparatus shown in Fig. 1.

A hollow two-part elongate frame or bar 10 supports a plurality of sets of pins 11. The bar 10 is formed by opposed channels 10a, 10b or the like, held together by suitable fastening means. The pins are in sets of six, corresponding in spacing to the braille dots. Thus, two rows of three pins each are used for each set. Each row of three extends transversely of the bar 10, as indicated most clearly in Figs. 1 and 3. The pins of each set thus form the six elements, combinations of which may form braille characters.

The fingers of the user may pass over the upper ends of the pins. By relatively positioning the pins 11 of each set, different recognizable braille characters may be formed. Thus, for instance, the letter "s" may be formed by relatively elevating the second and third pins of the first row and relatively elevating the first pin of the second row. As many sets of pins along bar 10 may be provided as is convenient or desirable. In the present instance, eight sets are provided.

Opposite ends of each pin are guidingly accommodated in aligned apertures 12 in the respective frame parts 10a, 10b. Each pin 11 has an integrally formed enlarged portion 13 located centrally of the pin. This enlarged portion 13 forms shoulders on opposite sides forming stops limiting opposite longitudinal movement of the pin 11 in the guiding apertures 12. The pin 11 is sufficiently long so that opposite ends do not move out of engagement with their guiding apertures whatever the longitudinal position of the pin is. The range of movement of the pins 11 is such that they may project beyond the outer surfaces of either frame element 10a or 10b.

In order to determine which of the pins 11 will be active, a braille book in the form of a perforated tape 14 is provided.

The tape 14 is wound upon a roller 15 having stub shafts 16 at opposite ends. The roller 15 is rotatable to facilitate unwinding of the tape 14 to position successive portions thereof in cooperative relationship with the pins. Spaced standards or plates 18 have recesses 17 formed in their upper edges for receiving the respective stub shafts 16. The standards 18 are secured upon a base 19 by the aid of feet 20 integrally formed on the standards 18.

A cylinder or drum 21 serves to position the operative portion of the tape. The tape 14 passes over the upper arcuate portion of the drum 21. The drum 21 has a shaft 22 rotatably supported by the standards 18 for angular movement of the drum about an axis parallel to the axis of movement of the roller 15. After passing over the upper part of the drum 21, the tape 14 passes to a take-up roller 23. The take-up roller 23, similar to the roller 15, has stub shafts 24 accommodated in recesses 25 formed on the standards 18.

The frame or bar 10 is mounted by the aid of standards 18 to be positioned immediately above the drum 21, the pins 11 being vertically oriented.

For so mounting the frame 10, lugs or pins 26 are provided at opposite ends of one of the frame elements 10b that are accommodated in elongate vertical guiding slots 27 formed in the standards 18. The bar or frame 10 is thus supported for vertical movement, the pins 26 normally resting at the bottom of the slots 27.

An enclosure member or housing 28 for the structure has an aperture in which the frame extends. When the frame 10 is in its lowermost position, the upper frame element 10a is contiguous with the top surface of the housing 28. The housing 28 is removably mounted upon the base 19 by suitable means (not shown).

The pins 11 are located opposite correspondingly spaced annular grooves 30 formed on the drum 21. Unless restrained, pins 11 drop into the grooves 30 under the influence of gravity, in which case the upper surfaces of the pins are substantially flush with the top surface of the upper frame element 10a.

The tape 14 is interposed between the lower ends of the pins 11 and the annular recesses 30 to restrain selected pins from downward movement and permit the remaining pins to move downwardly. For this purpose, the tape 14 has perforations 31 that may register with the lower ends of selected pins 11. The tape is imperforate opposite the remaining pins. Accordingly, some of the pins 11 of each set are relatively elevated to form braille characters.

The tape 14 has rows of perforations, each cooperable in succession with the frame 10. Each row corresponds to a line of the book. The tape is intermittently advanced in order to position successive lines of the tape 14 beneath the pins 11. In order to permit the tape 14 to be advanced, the pins 11 are first retracted to be fully out of engagement with the tape 14.

A bell crank lever 32 pivotally carried on one of the standards 18 has a movable end engageable beneath the lower frame element 10b. Upon angularly moving the bell crank lever 32 in a clockwise direction as viewed in Fig. 1, the frame structure along with the pins 11 is moved upwardly through the housing aperture 29. For this purpose, a depressible plunger 33 is provided. This plunger extends downwardly through the top of the housing 28 and is guided for movement by the aid of a bushing 34.

A pin 35, accommodated in an elongate slot on the opposite side of the bell crank lever 32, interconnects the plunger 33 and the bell crank lever 32. Upon downward movement of the plunger 33, the bell crank lever 32 is rotated angularly to lift the frame 10.

Downward movement of the plunger 33 is also availed of to advance the tape 14 by rotation of the drum or cylinder 21. Rotation of the drum 21 advances the tape by virtue of a driving connection between the tape and the drum. Thus, the drum 21 has sprocket projections 36 at opposite ends engaging uniformly and correspondingly spaced apertures at the opposite edges of the tape 14.

The drum 21 carries a ratchet wheel 37 engaged by a pawl 38 carried at the lower end of the plunger 33. A light spring 39 urges the pawl 38 in a direction to engage the ratchet wheel 37. The pawl 38 is so formed as to have a substantial overtravel. In this manner it is ensured that the frame 10 is first lifted before the drum 21 is indexed.

Rotation of the drum 21 also causes angular movement of the take-up roller 23. For this purpose, a flexible belt 40 cooperates with pulleys 41 and 42 formed on the drum 21 and take-up roller 23 respectively. The ratio of the transmission between the pulleys 41 and 42 is sufficiently large to ensure full take-up of the tape 14 when the tape 14 is first being wound upon the take-up roller 23. As the diameter of the tape 14 wound upon the take-up roller 23 increases, a smaller ratio is required to effect full take-up. To ensure against rupture of the tape 14, the belt 40 slips relative to the pulleys effectively to reduce the ratio of transmission.

The indexing movement of the drum 21 corresponds precisely to the spacing between successive rows of information on the tape 14. A star wheel 43, mounted on the drum shaft 22 and engaged by a spring-pressed detent 44, ensures accurate positioning of the drum 21.

After the indexing movement of the drum 21 has been completed, the plunger 33 is released and returned to its inoperative position by the aid of a compression spring 45. In returning to its initial position, the bell crank lever 32 rotates, causing downward movement of the frame 10, and the pins cooperate with the successive portion of the tape to form a new line of braille characters.

Once the tape 14 is installed, the entire book can be read without requiring direct physical contact with the tape, ensuring a sanitary condition. Correspondingly, the tape 14 is protected against damage.

The tape 14 is easily placed in operative position upon the user by placing the terminal portion of the tape onto the drum 21, and threading it onto take-up roller 23.

The inventor claims:

1. In reading apparatus for the blind: a frame; parallel pins carried by the frame; said frame having means guiding the pins for longitudinal movement; opposite ends of the pins being movable beyond opposite sides of the frame; a drum beneath the frame and opposite corresponding first ends of the pins; the pins being biased for movement in one direction toward said drum; said drum having recesses formed therein corresponding to the locations of said pins for receiving said first ends of said pins; means limiting movement of said pins with respect to said frame in said one direction; a braille book in the form of a tape in driving engagement with the drum passing about the drum between the drum and said corresponding first ends of said pins; said tape having perforate and imperforate portions permitting and restraining movement of selected pins in said one direction, corresponding other ends of the restrained pins forming characters accessible and legible by touch for reading; means mounting the frame for movement toward and away from said drum for operatively positioning and retracting said pins; an operator for angularly moving the drum through a pre-set angle, including a lost motion connection; and means for retracting the frame during lost motion movement of the operator.

2. In reading apparatus for the blind: a rotatable drum; a braille book in the form of a perforated tape passing about the drum; said drum having recesses aligned with the perforations of said tape; said drum and said tape having interengageable means for advancement of said tape upon rotation of said drum; a support extending substantially parallel to and above the drum; a series of pins slidably carried by the support and having sensing ends cooperable with the tape; the sensing ends of those pins aligned with the perforations passing through the perforations and into said recesses, the sensing ends of the remaining pins being restrained by said tape; the opposite ends of the pins restrained from movement forming braille characters; and means for lifting the pins and for advancing the drum through a definite angle corresponding to the spacing of successive sets of perforations.

3. In reading apparatus for the blind, a housing, said housing including a guide means, a plurality of substantially parallel pins having tactile ends received by said guide means, said pins being axially movable relative to said guide means between a projected position with said tactile ends accessible above said guide means and projecting outside said housing and a retracted position with said tactile ends withdrawn toward said guide means relative to said projected position, the opposite ends of the pins projecting below and being correspondingly movable beneath the guide means interiorly of said housing, means biasing the pins in a direction corresponding to said retracted position, a member interiorly of said housing substantially adjacent to and beneath the guide means and said opposite ends of said pins, said member having recesses corresponding to the locations of said pins for receiving said opposite ends of said pins in said retracted positions, and means for raising all said pins together relative to said member and withdrawing said opposite ends thereof from said recesses to permit the feed of a braille book in the form of a perforated tape between said member and said opposite ends of said pins, whereby the unperforated areas of said tape engage said opposite ends of said pins and thereby support such pins in said projected position, and the peforations in said tape permit said opposite ends of said pins to pass through said tape and into said recesses in said member, thereby causing such pins to move into said retracted position, thus forming tactile braille characters with the tactile ends of said pins.

4. In a device as set forth in claim 3, means for feeding said tape step by step a predetermined length for each step.

5. In a device as set forth in claim 3, means for feeding said tape step by step a predetermined length for each step, a common operator for said pin raising means and tape feeding means causing said pins to be raised and said tape to be fed in synchronized sequence.

6. In a device as set forth in claim 3, said member being a drum, means on said drum for engaging said tape and causing the same to pass over said drum when said drum is rotated, a rotational drive means for said drum including a ratchet wheel, a pawl coacting with said ratchet wheel for rotating said wheel, and an operator for driving said pawl a determined distance with each stroke of said operator, said pin raising means coacting with said operator to cause said pins to be raised with each stroke of said operator.

7. In a device as set forth in claim 6, a tape take-up reel, and a slippable drive connection between said drum drive means and said take-up reel.

References Cited in the file of this patent
UNITED STATES PATENTS

| | | |
|---|---|---|
| 1,178,991 | Brown | Apr. 11, 1916 |
| 2,273,740 | Terry | Feb. 17, 1942 |
| 2,521,338 | Bryce et al. | Sept. 5, 1950 |
| 2,549,632 | Nottingham | Apr. 17, 1951 |

FOREIGN PATENTS

| | | |
|---|---|---|
| 1,018,369 | France | Jan. 7, 1953 |
| 297,897 | Germany | May 25, 1917 |
| 608,509 | Germany | Jan. 24, 1935 |